United States Patent
Boenapalli et al.

(10) Patent No.: US 12,481,596 B2
(45) Date of Patent: Nov. 25, 2025

(54) EFFICIENT OFFLOADING OF BACKGROUND OPERATIONS

(71) Applicant: QUALCOMM Incorporated, San Diego, CA (US)

(72) Inventors: Madhu Yashwanth Boenapalli, Hyderabad (IN); Surendra Paravada, Hyderabad (IN); Sai Praneeth Sreeram, Anantapur (IN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 18/061,451

(22) Filed: Dec. 3, 2022

(65) Prior Publication Data

US 2024/0184711 A1 Jun. 6, 2024

(51) Int. Cl.
*G06F 12/1009* (2016.01)

(52) U.S. Cl.
CPC .. *G06F 12/1009* (2013.01); *G06F 2212/1016* (2013.01)

(58) Field of Classification Search
USPC .......... 711/103, 154, 202, 206, 203
See application file for complete search history.

(56) References Cited

U.S. PATENT DOCUMENTS

| | | | | |
|---|---|---|---|---|
| 11,301,372 | B1 * | 4/2022 | Huo .................... | G06F 12/0882 |
| 2011/0099145 | A1 * | 4/2011 | Hahn .................. | G06F 16/1847 |
| | | | | 707/613 |
| 2014/0082268 | A1 * | 3/2014 | Kim .................... | G06F 3/0656 |
| | | | | 711/103 |

(Continued)

FOREIGN PATENT DOCUMENTS

| | | | | |
|---|---|---|---|---|
| CN | 105867850 A | * | 8/2016 | ............ G06F 3/061 |
| WO | 2022193126 A1 | | 9/2022 | |

OTHER PUBLICATIONS

JEDEC Standard: "Universal Flash Storage (UFS) Host Performance Booster (HPB) Extension", Version 2. 0, JEDEC—JEDEC Solid State Technology Association, vol. JESD220-3A, Sep. 1, 2020, 42 Pages, XP009541919, Section 5.

(Continued)

*Primary Examiner* — Jared I Rutz
*Assistant Examiner* — Elias Young Kim
(74) *Attorney, Agent, or Firm* — Muncy, Geissler, Olds & Lowe, P.C.

(57) ABSTRACT

Methods that may be performed by a host controller of a computing device for host performance booster (HPB) mode management. Embodiments may include enabling an HPB mode based on availability of the host controller and availability of a memory device controller. In some embodiments, enabling the HPB mode based on the availability of the host controller and the availability of the memory device controller may include enabling a device control mode in response to an operating state of the host controller being busy and an operating state of the memory device controller being available. In some embodiments, enabling the HPB mode based on the availability of the host controller and the availability of the memory device controller may include enabling a host control mode in response to the operating state of the host controller being available and the operating state of the memory device controller being busy.

28 Claims, 10 Drawing Sheets

(56) References Cited

U.S. PATENT DOCUMENTS

| | | | | |
|---|---|---|---|---|
| 2019/0278518 A1* | 9/2019 | Byun | ................... | G06F 3/0659 |
| 2020/0192816 A1* | 6/2020 | Byun | ................... | G06F 3/0604 |
| 2020/0226072 A1* | 7/2020 | Kang | ................... | G06F 12/10 |
| 2020/0356280 A1* | 11/2020 | Sela | ................... | G06F 3/0661 |
| 2021/0026777 A1* | 1/2021 | Byun | ................... | G06F 9/54 |
| 2021/0216458 A1* | 7/2021 | Kang | ................... | G06F 12/0815 |
| 2021/0397365 A1* | 12/2021 | Kim | ................... | G06F 3/0611 |
| 2022/0004338 A1* | 1/2022 | Lee | ................... | G06F 3/0653 |
| 2023/0062372 A1* | 3/2023 | Cariello | ................... | G06F 3/0659 |
| 2023/0229590 A1* | 7/2023 | Bi | ................... | G06F 12/0292 |
| | | | | 711/154 |

OTHER PUBLICATIONS

International Search Report and Written Opinion—PCT/US2023/035181—ISA/EPO—Feb. 13, 2024. 16 pages.
JEDEC Standard: "Universal Flash Storage (UFS), Version 3.1", JEDEC—JEDEC Solid State Technology Association, vol. JESD220E, Jan. 1, 2020, 421 Pages, XP009541917, The Whole Document.

* cited by examiner

EFFICIENT OFFLOADING OF BACKGROUND OPERATIONS

BACKGROUND

Developers and users of computing devices are always seeking improved operation performance. One method to improve operations of computing devices is a host performance booter (HPB) mode in which host components store and use logical-to-physical (L2P) address mapping tables for host components to access memory device components. The logical-to-physical (L2P) address mapping tables enable knowledge of whether data sought by host components is located at the memory device and whether such locations are active. Knowledge of existence of data and activity status of locations of the data at the memory device reduces input/output transaction times for accessing data by host components at the memory device, thereby improving operation performance.

SUMMARY

Various aspects include methods and a host controller of a computing device performing the methods for host performance booster (HPB) mode management, including enabling an HPB mode based on availability of the host controller and availability of a memory device controller.

Some aspects may further include checking an operating state of the host controller, and checking an operating state of the memory device controller. In some aspects enabling the HPB mode based on the availability of the host controller and the availability of the memory device controller may include enabling a device control mode in response to the operating state of the host controller being busy and the operating state of the memory device controller being available. In some aspects enabling the HPB mode based on the availability of the host controller and the availability of the memory device controller may include enabling a host control mode in response to the operating state of the host controller being available and the operating state of the memory device controller being busy.

Some aspects may further include waiting for the memory device controller to clear a busy state in response to the operating state of the host controller being busy and the operating state of the memory device controller being busy, in which enabling the HPB mode based on the availability of the host controller and the availability of the memory device controller may include enabling a device control mode in response to the memory device controller to clearing the busy state.

Some aspects may further include determining whether an address mapping table for the host controller and an address mapping table for the memory device controller are synchronized, in which checking the operating state of the host controller and checking the operating state of the memory device controller occur in response to determining that the address mapping table for the host controller and the address mapping table for the memory device controller are not synchronized.

Further aspects include a computing device including a host controller configured to perform operations of any of the methods summarized above. Further aspects include a computing device including means for performing functions of any of the methods summarized above. Further aspects include a host controller for use in a computing device, the host controller including a processor configured to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1:
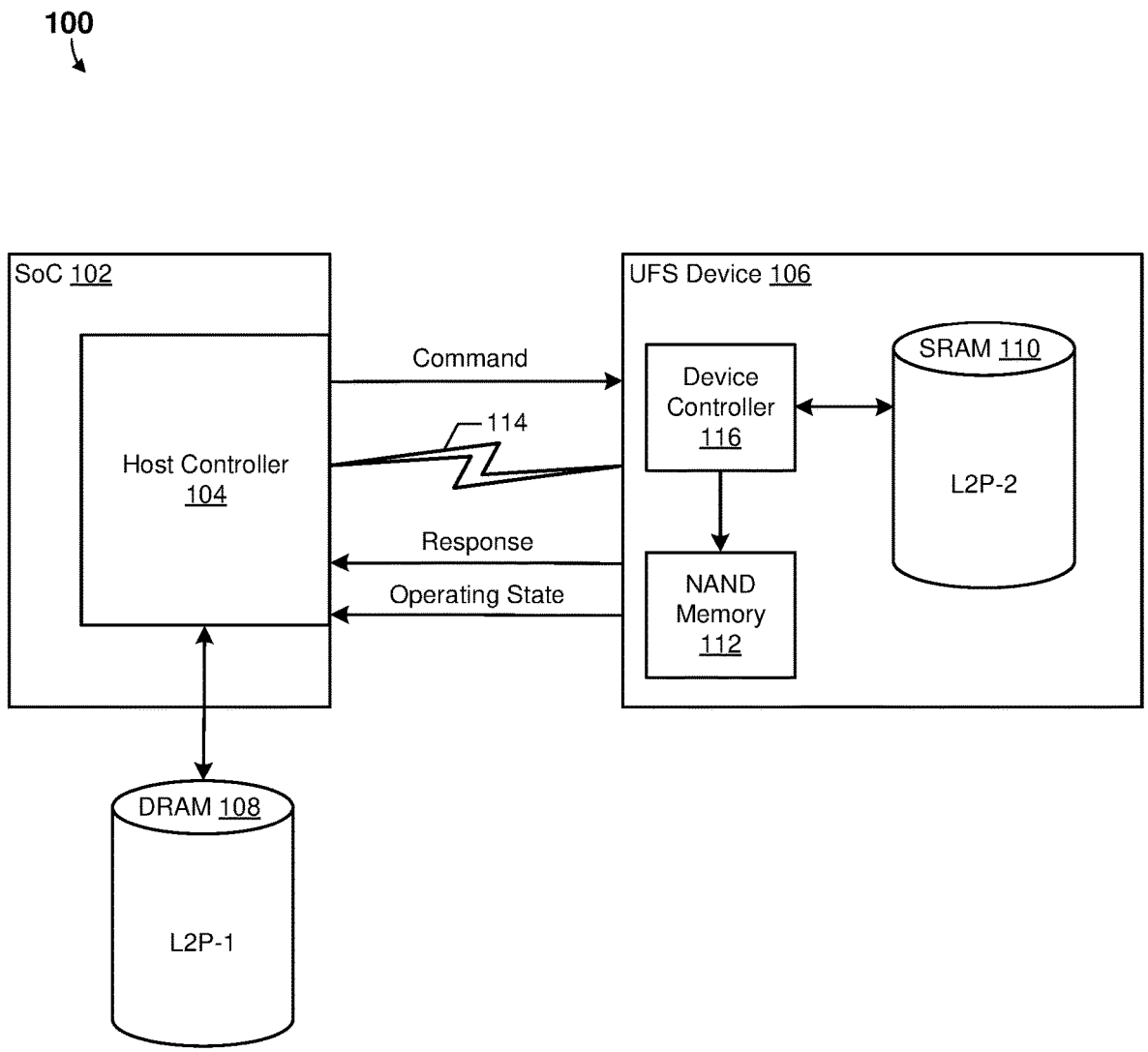
FIG. 1 is a system block diagram illustrating an example memory system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods and computing devices including a host controller that manage host performance booster (HPB) modes based on availability of a host controller, such as a component of a system-on-a-chip (SoC), and/or availability of a memory device controller (also referred to herein as a device controller), such as a component of a universal flash storage (UFS) device. In some embodiments, different HPB modes, such as a host control mode (HCM) and/or a device control mode (DCM), may be enabled based on availability of the host controller and/or availability of the memory device controller. In some embodiments, the DCM may be enabled based on the host controller being busy and the memory device controller being available. In some embodiments, the HCM may be enabled based on the host controller being available and the memory device controller being busy. In some embodiments, the DCM may be enabled based on both the host controller and the memory device controller being busy and following the memory device controller becoming available.

The term "system-on-a-chip" (SoC) is used herein to refer to a single integrated circuit (IC) chip that contains multiple resources and/or processors integrated on a single substrate. A single SoC may contain circuitry for digital, analog, mixed-signal, and radio-frequency functions. A single SoC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SoCs may also include software for controlling the integrated resources and processors, as well as for controlling peripheral devices.

The term "system-in-a-package" (SIP) may be used herein to refer to a single module or package that contains multiple resources, computational units, cores and/or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SoCs coupled together via high-speed communication circuitry and packaged in close proximity, such as on a single motherboard or in a single computing device. The proximity of the SoCs facilitates high speed communications and the sharing of memory and resources.

Developers and users of computing devices are always seeking improved operation performance. One means implemented in computing devices to improve operation performance is a host performance booter (HPB) mode in which a host memory, such as a dynamic random access memory (DRAM) communicably connected to a host controller of an SoC, is used as a cache for a flash transition layer (FTL). The FTL maintains a logical-to-physical (L2P) address mapping table in flash memory of an UFS device connected to the host controller. The L2P address mapping table enables knowledge of whether data sought by host components is located at the flash memory and whether such locations are active. The HPB mode enables the host memory to maintain an L2P address mapping table, which may correspond to at least part of the L2P address mapping table in the flash memory. L2P address mapping table entries at the host memory can be read by the host controller and physical addresses from the L2P address mapping table entries stored in the host memory may be used to execute memory access transactions for the flash memory located at the UFS device faster than executing memory access transactions using logical addresses for the flash memory located on the UFS device, which requires the UFS device to translate the logical addresses to physical addresses. Improving the speed of memory access transactions may improve operation performance.

The L2P address mapping table at the host memory may need to be updated prior to use to ensure that the L2P address mapping table at the host memory and at the flash memory are synchronized. Under different circumstances, the HPB mode can be set to HCM or DCM. When the HPB mode is set to HCM, the host controller may identify which subregions of the L2P address mapping table at the host memory are active and/or inactive. When the HPB mode is set to DCM, the memory device controller may identify which subregions of the L2P address mapping table at the flash memory are active and/or inactive and notify the host controller to update the L2P address mapping table at the host memory. The performance improvements realized by the HPB mode can be negatively affected when the HPB mode is set to HCM or DCM and other operations at the host controller or the memory device controller, respectively, slow execution of the L2P address mapping table synchronization operations.

Various embodiments address and overcome the foregoing problems of L2P address mapping table synchronization performance degradation by other operations executed by the same controller by dynamically enabling HCM or DCM based on availability of the host controller or the memory device controller, respectively. Basing enablement of HCM or DCM on availability of the host controller or the memory device controller reduces or eliminates the effects of other operations at the host controller or the memory device controller slowing execution of the L2P address mapping table synchronization operations by the host controller or the memory device controller. Various embodiments include enabling the HCM or DCM based on whether the host controller or the memory device controller meets availability criteria. Enabling the HCM or DCM based on such criteria may reduce impact on execution of the L2P address mapping table synchronization operations by execution of other operations, if any, at the host controller or the memory device controller compared to current implementations of the HPB modes.

The host controller may check an operating state, such as available or busy, of the host controller itself and/or the memory device controller. The operating state for each of the host controller and the memory device controller may depend on operations pending for and/or being executed by the respective controller. Criteria for different operating states for each of the host controller and the memory device controller may vary between different implementations. The criteria may include a number of the operations, a duration of execution for the operations, etc. For example, the host controller and the memory device controller may have an operating state of busy when a single operation is pending for and/or being executed by the respective controller, and an operating state available when no operation is pending for and/or being executed by the respective controller, or when the respective controller is idle. As another example, the host controller and the memory device controller may have an operating state of busy when any number of operations greater than one are pending for and/or being executed by the respective controller, and an operating state available when fewer operations than the number are pending for and/or being executed by the respective controller.

In some embodiments, checking the operating state of the host controller and/or the memory device controller may include determining a metric for pending and/or executing operations, such as a number of the operations, a duration of execution for the operations, etc., and comparing the metric to a threshold for determining the operating state for the respective controller. In some embodiments, checking the operating state of the host controller and/or the memory device controller may include receiving and interpreting a signal from of the host controller and/or the memory device controller configured to indicate the operating state.

The host controller may enable DCM for the HPB mode in response to the host controller having an operating state of busy and the memory device controller having an operating state of available. DCM, rather than HCM, is enabled during busy periods for the host controller as using DCM reduces a load on the host controller by shifting the burden of determining inactive and active regions in the L2P table address mapping table to the memory device controller. As such the host controller avoids determining inactive and active regions in the L2P address mapping table while fetching commands, sorting the commands, and pushing the commands on to a command queue for execution as the host controller would be required to do when HCM is enabled for the HPB mode while the host controller has an operating state of busy.

The host controller may enable HCM for the HPB mode in response to the host controller having an operating state of available and the memory device controller having an operating state of busy. HCM, rather than DCM, is enabled during busy periods for the memory device controller because using HCM reduces a load on the memory device controller by shifting the burden of determining inactive and active regions in the L2P table address mapping table to the host controller. As such, the memory device controller avoids determining inactive and active regions in the L2P table address mapping table while implementing background and/or maintenance operations as the memory device controller would be required to do when DCM is enabled for the HPB mode while the memory device controller has an operating state of busy.

FIG. 1 is a system block diagram illustrating an example system suitable for implementing any of the various embodiments. The system 100 may include one or more computing devices or processors for performing HPB mode management. For example, the system 100 may include an SoC 102 including a host controller 104, a DRAM 108 communicably connected to the host controller 104, and a UFS device 106 communicably connected to the host controller 104 via a link 114. The host controller 104 may include a processor (not shown separately) configured to perform operations of the host controller described herein. The host controller 104 may maintain and access stored L2P mapped entries (i.e., data) of an L2P-1 address mapping table. In some embodiments, the L2P mapped entries of the L2P-1 address mapping table may be stored at the DRAM 108 or an SRAM (not shown) integral to the SoC 102, and/or the host controller 104. The UFS device 106 may include a device controller 116, a static random access memory (SRAM) 110, and a NAND memory 112. The device controller 116 may be coupled to the SRAM 110 and the NAND memory 112, such that the device controller 116 may interface L2P mapped entries (i.e., data) of an L2P-2 address mapping table between the NAND memory 112 and the SRAM 110.

The host controller 104 may receive read commands from other components of the SoC 102 and/or from components communicably connected to the SoC 102 (e.g., via I/O of the SoC). When HPB is enabled, in response to the read commands, the host controller 104 may check an operating state, such as available or busy, for the host controller 104 and for the device controller 116.

The operating state for each of the host controller 104 and the device controller 116 may depend on operations pending for and/or being executed by the respective controller 104, 116. Criteria for different operating states for each of the host controller 104 and the device controller 116 may vary between different implementations. The criteria may include a number of the operations, a duration of execution for the operations, etc. For example, the host controller 104 and the device controller 116 may have an operating state of busy when a single operation is pending for and/or being executed by the respective controller 104, 116, and an operating state available when no operation is pending for and/or being executed by the respective controller 104, 116, or when the respective controller 104, 116 is idle. As another example, the host controller 104 and the device controller 116 may have an operating state of busy when any number of operations greater than one are pending for and/or being executed by the respective controller 104, 116, and an operating state available when fewer operations than the number are pending for and/or being executed by the respective controller 104, 116. The number of operations pending and/or being executed may be determined by a number of entries in an operations queue, such as a command queue (CMDQ).

In some embodiments, checking the operating state of the host controller 104 and/or the device controller 116 may include determining a metric for pending and/or executing operations, such as a number of the operations, a duration of execution for the operations, etc., and comparing the metric to a threshold for determining the operating state. In some embodiments, checking the operating state of the host controller 104 and/or the device controller 116 may include receiving and interpreting a signal from of the host controller 104 and/or the device controller 116 configured to indicate the operating state (e.g., "Operating State" in FIG. 1).

The host controller 104 may enable DCM for the HPB mode in response to the host controller 104 having an operating state of busy and the device controller 116 having an operating state of available. Enabling DCM may trigger the device controller 116 to determine inactive and active regions in the L2P-2 address mapping table to use in L2P address mapping table synchronization. The host controller 104 may enable HCM for the HPB mode in response to the host controller 104 having an operating state of available and the device controller 116 having an operating state of busy. Enabling HCM may trigger the host controller 104 to determine inactive and active regions in the L2P-1 address mapping table to use in L2P address mapping table synchronization.

Figure 2:
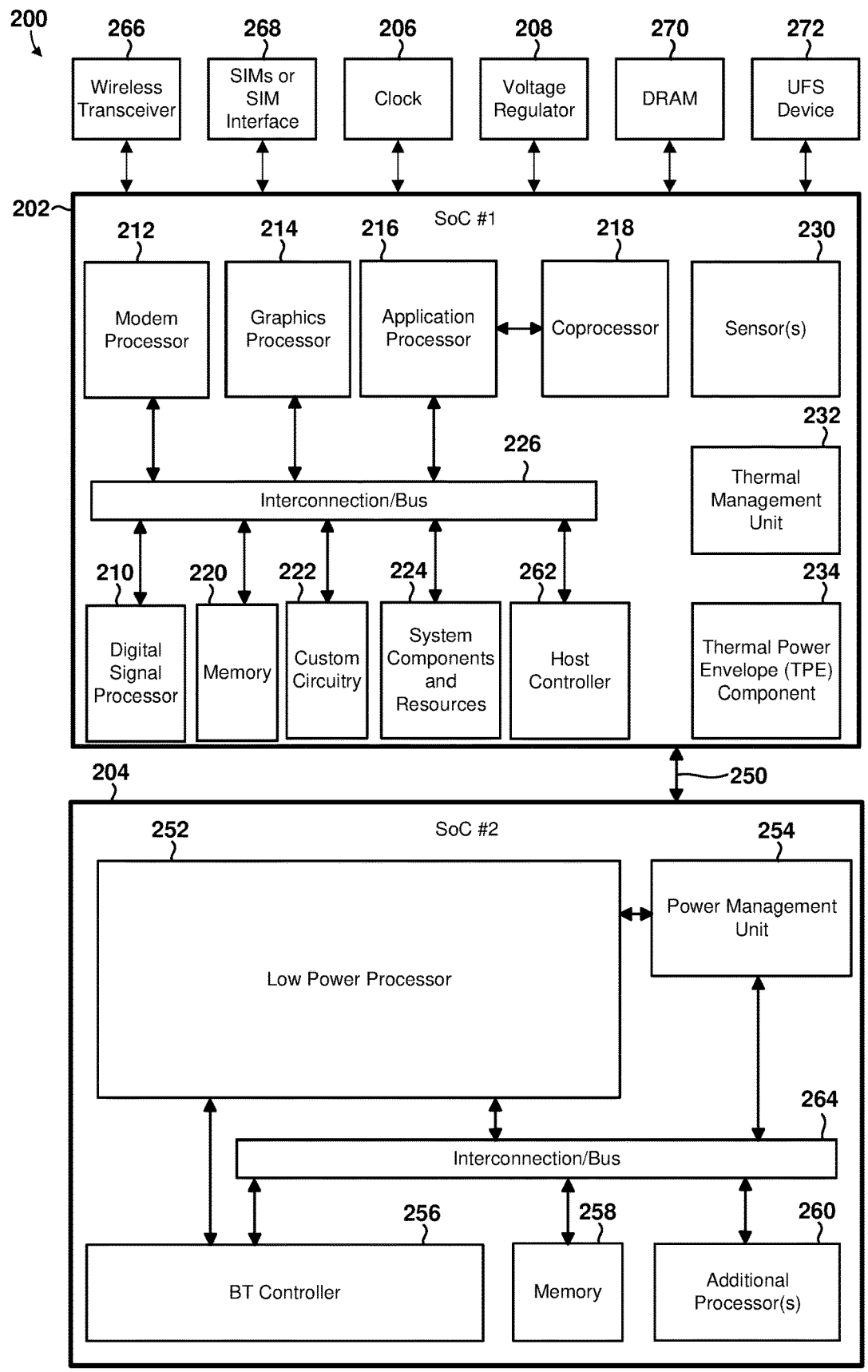
FIG. 2 is a component block diagram illustrating an example computing device suitable for implementing any of the various embodiments.

FIG. 2 is a component block diagram illustrating an example computing device 200 suitable for implementing any of the various embodiments. Various embodiments may be implemented on a number of single processor and multiprocessor computer systems, including a system-on-chip (SoC) or system in a package.

With reference to FIGS. 1 and 2, the illustrated example computing device 200 (which may be a system-in-a-package in some embodiments) includes a two SoCs 202, 204 (e.g., SoC 102) coupled to a clock 206, a voltage regulator 208, at least one subscriber identity module (SIM) 268 and/or a SIM interface, a DRAM 270 (e.g., DRAM 108) having a stored L2P address mapping table (e.g., L2P-1), a UFS device 270 (e.g., UFS device 106) having a stored L2P address mapping table (e.g., L2P-2), a wireless transceiver 266 configured to send and receive wireless communications via an antenna (not shown) to/from wireless computing devices, such as a base station, wireless device, and/or computing device (e.g., system 100). In some embodiments, the first SoC 202 may operate as central processing unit (CPU) of the computing device 200 that carries out the instructions of software application programs by performing the arithmetic, logical, control and input/output (I/O) operations specified by the instructions. In some embodiments, the second SoC 204 may operate as a specialized processing unit. For example, the second SoC 204 may operate as a specialized 5G processing unit responsible for managing high volume, high speed (e.g., 5 Gbps, etc.), and/or very high frequency short wavelength (e.g., 28 GHz mmWave spectrum, etc.) communications.

The first SoC 202 may include a digital signal processor (DSP) 210, a modem processor 212, a graphics processor 214, an application processor (AP) 216, one or more coprocessors 218 (e.g., vector co-processor) connected to one or more of the processors, memory 220, custom circuitry 222, system components and resources 224, a host controller 262 (e.g., host controller 104), an interconnection/bus module 226, one or more sensors 230 (e.g., accelerometer, temperature sensor, pressure sensor, optical sensor, infrared sensor, analog sound sensor, etc.), a thermal management unit 232, and a thermal power envelope (TPE) component 234. The second SoC 204 may include a low power processor 252, a power management unit 254, an interconnection/bus module 264, a BT controller 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SoC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SoC 202, 204 may include various system components, resources, and custom circuitry for managing sensor data, analog-to-digital conversions, wireless data transmissions, and for performing other specialized operations, such as decoding data packets and processing encoded audio and video signals for rendering in a web browser or audio/video application. For example, the system components and resources 224 of the first SoC 202 may include power amplifiers, voltage regulators, oscillators, phase-locked loops, peripheral bridges, data controllers, memory controllers, system controllers, access ports, timers, and other similar components used to support the processors and software clients running on a computing device. The system components and resources 224 and/or custom circuitry 222 may also include circuitry to interface with peripheral devices, such as cameras, electronic displays, wireless communication devices, external memory chips, etc.

The first and second SoC 202, 204 may communicate via interconnection/bus module 250. In some embodiments, the interconnection/bus module may be a connection established by transceiving (i.e., receiving and transmitting) components within both the SoC 202 and SoC 204. For example, the low power processor 252 may include a universal asynchronous receiver-transmitter (UART) and the application processor 216 may include a multiple signal messages (MSM) UART driver that is communicatively connected to the UART of the low power processor 252.

The various processors 210, 212, 214, 216, 218, may be interconnected to one or more memory elements 220, system components and resources 224, and custom circuitry 222, and a thermal management unit 232 via an interconnection/bus module 226. Similarly, the low power processor 252 may be interconnected to the power management unit 254, the BT controller 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SoCs 202, 204 may further include an input/output module (not illustrated) for communicating with resources external to the SoC, such as a clock 206, a voltage regulator 208, one or more wireless transceivers 266, and at least one SIM 268 and/or SIM interface (i.e., an interface for receiving one or more SIM cards). Resources external to the SoC (e.g., clock 206, voltage regulator 208) may be shared by two or more of the internal SoC processors/cores. The at least one SIM 268 (or one or more SIM cards coupled to one or more SIM interfaces) may store information supporting multiple subscriptions, including a first 5GNR subscription and a second 5GNR subscription, etc.

In addition to the example computing device 200 discussed above, various embodiments may be implemented in a wide variety of computing systems, which may include a single processor, multiple processors, multicore processors, or any combination thereof.

In some embodiments, the various processors of the SoC 202 and SoC 204 may be located within a same SoC. For example, the application processor 216 and low power processor 252 may be located within a same SoC, such as in a single SoC of a wearable device, to perform L2P table synchronization functions.

Figure 3:
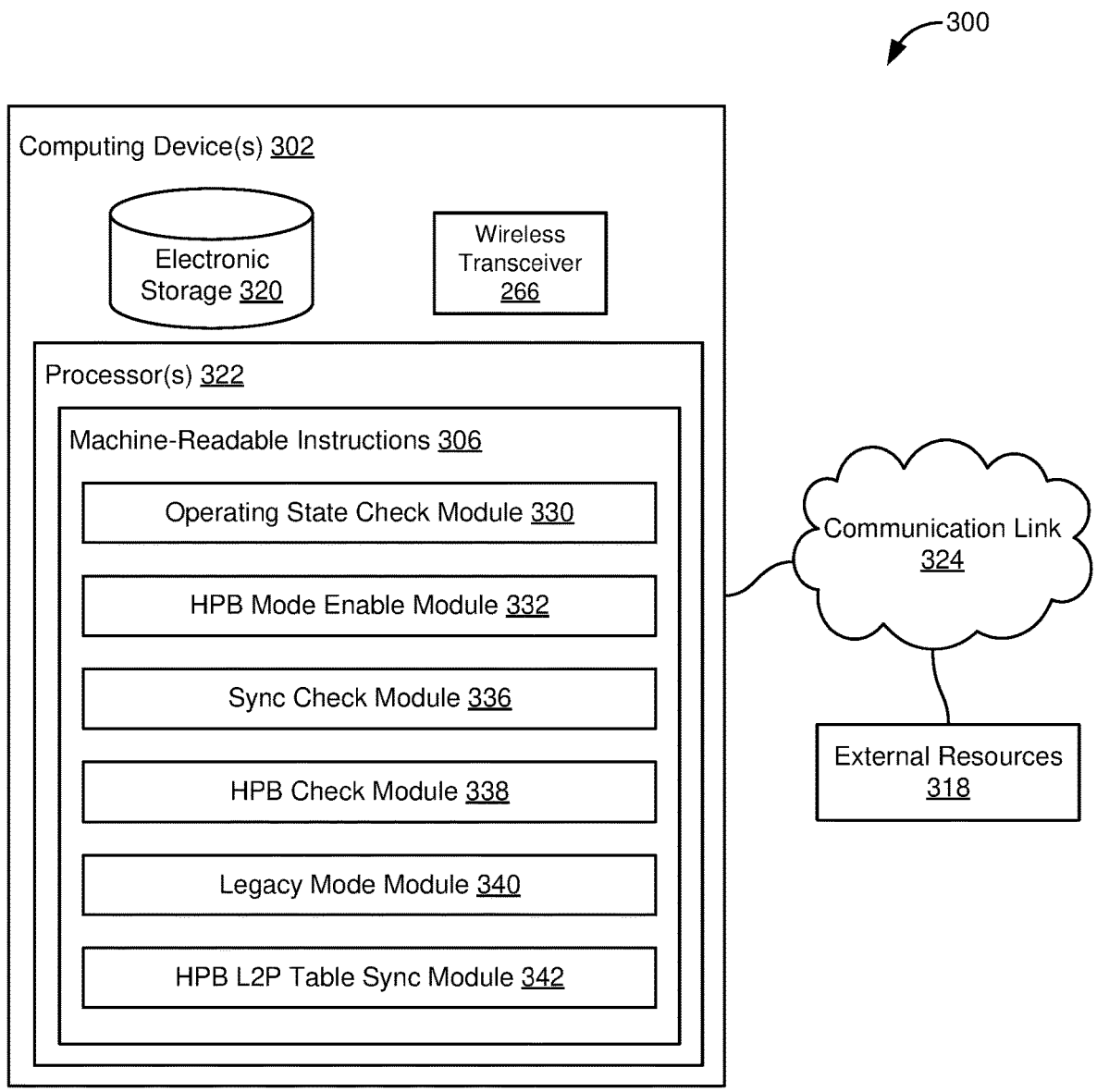
FIG. 3 is a component block diagram illustrating an example system configured for host performance booster (HPB) mode management according to some embodiments.

FIG. 3 is a component block diagram illustrating an example system 300 configured to manage HPB modes according to some embodiments. With reference to FIGS. 1-3, the system 300 may include one or more computing device(s) 302 (e.g., system 100, computing device 200) and external resources 318, which may communicate via a communication link 324 (e.g., link 114). External resources 318 may include sources of information outside of the system 300, external entities participating with the system 300, or other resources. For example, external resources 318 may be a computing device that may transmit read requests to the computing device(s) 302. In some implementations, some or all of the functionality attributed herein to external resources 318 may be provided by resources included in the system 300. The system 300 may include a plurality of hardware, software, and/or firmware components operating together to provide the functionality attributed herein to the processor 322 (e.g., host controller 104, 262).

The computing device(s) 302 may include electronic storage 320 that may be configured to store information related to functions implemented by an operating state check module 330, an HPB mode enable module 332, a sync check module 336, an HPB check module 338, a legacy mode module 340, an HPB L2P address mapping table sync module 342, and any other instruction modules.

The electronic storage 320 may include non-transitory storage media that electronically stores information. The electronic storage 320 may include one or both of system storage that is provided integrally (i.e., substantially non-removable) with the system 300 and/or removable storage that is removably connectable to the system 300 via, for example, a port (e.g., a universal serial bus (USB) port, a firewire port, etc.) or a drive (e.g., a disk drive, etc.).

In various embodiments, electronic storage 320 (e.g., DRAM 106, 270, UFS device 106, 272) may include one or more of electrical charge-based storage media (e.g., EEPROM, RAM, etc.), solid-state storage media (e.g., flash drive, etc.), optically readable storage media (e.g., optical disks, etc.), magnetically readable storage media (e.g., magnetic tape, magnetic hard drive, floppy drive, etc.), and/or other electronically readable storage media. The electronic storage 320 may include one or more virtual storage resources (e.g., cloud storage, a virtual private network, and/or other virtual storage resources). The electronic storage 320 may store software algorithms, information determined by processor(s) 322, and/or other information that enables the system 300 to function as described herein. The electronic storage 320 may store one or more L2P address mapping table (e.g., L2P-1, L2P-2).

The computing device(s) 302 may be configured by machine-readable instructions 306. Machine-readable instructions 306 may include one or more instruction modules. The instruction modules may include computer program modules. The instruction modules may include one or more of the operating state check module 330, the HPB mode enable module 332, the sync check module 336, the HPB check module 338, the legacy mode module 340, the HPB L2P address mapping table sync module 342, and other instruction modules (not illustrated). The computing device(s) 302 may include processor(s) 322 configured to implement the machine-readable instructions 306 and corresponding modules.

The processor(s) 322 may include one of more local processors that may be configured to provide information processing capabilities in the system 300. As such, the processor(s) 322 may include one or more of a digital processor, an analog processor, a digital circuit designed to process information, an analog circuit designed to process information, a state machine, and/or other mechanisms for electronically processing information. Although the processor(s) 322 is shown in FIG. 3 as a single entity, this is for illustrative purposes only. In some embodiments, the processor(s) 322 may include a plurality of processing units. These processing units may be physically located within the same device, or the processor(s) 322 may represent processing functionality of a plurality of devices distributed in the system 300.

In some embodiments, the processor(s) 322 executing the operating status check module 330 may be configured to check an operating state of a host controller (e.g., host controller 104, 262) and/or a device controller (e.g., device controller 116). In some embodiments, checking the state of the operating state of a host controller and/or the device controller may include determining a metric for pending and/or executing operations, such as a number of the operations, a duration of execution for the operations, etc., and comparing the metric to a threshold for determining the operating state for the respective controller. In some embodiments, checking the operating state of the host controller and/or the memory device controller may include receiving and interpreting a signal from of the host controller and/or the memory device controller configured to indicate the operating state.

In some embodiments, the processor(s) 322 executing the HPB mode enable module 332 may enable HCM and/or DCM as the HPB mode in response to the operating state of the host controller and/or the memory device controller. For example, the processor(s) 322 executing the HPB mode enable module 332 may enable DCM for the HPB mode in response to the host controller having an operating state of busy and the device controller having an operating state of available. The processor(s) 322 executing the HPB mode enable module 332 may enable HCM for the HPB mode in response to the host controller having an operating state of available and the device controller having an operating state of busy.

In some embodiments, the processor(s) 322 executing the sync check module 336 may be configured to determine whether an L2P address mapping table stored at a DRAM communicatively connected to the host controller is out of synchronization with an L2P address mapping table stored at an SRAM of a UFS device communicatively connected to the host controller via a link.

In some embodiments, the processor(s) 322 executing the HPB check module 338 may be configured to determine whether HPB is enabled.

In some embodiments, the processor(s) 322 executing the legacy mode module 340 may be configured to perform legacy mode L2P address mapping table synchronization operations.

In some embodiments, the processor(s) 322 executing the HPB L2P address mapping table sync module 342 may be configured to perform L2P address mapping table synchronization in an HCM or DCM.

The description of the functionality provided by the different modules 330-342 is for illustrative purposes, and is not intended to be limiting, as any of modules 330-342 may provide more or less functionality than is described. For example, one or more of modules 330-342 may be eliminated, and some or all of its functionality may be provided by other ones of modules 330-342. As another example, processor(s) 322 may execute one or more additional modules that may perform some or all of the functionality attributed below to one of modules 330-342.

In some embodiments, the operating state check module 330, the HPB mode enable module 332, the sync check module 336, the HPB check module 338, the legacy mode module 340, the HPB L2P address mapping table sync module 342, may be implemented by a host controller (e.g., host controller 104, 262) of the computing device(s) 302, which may be and/or may include processor 322.

Figure 4:
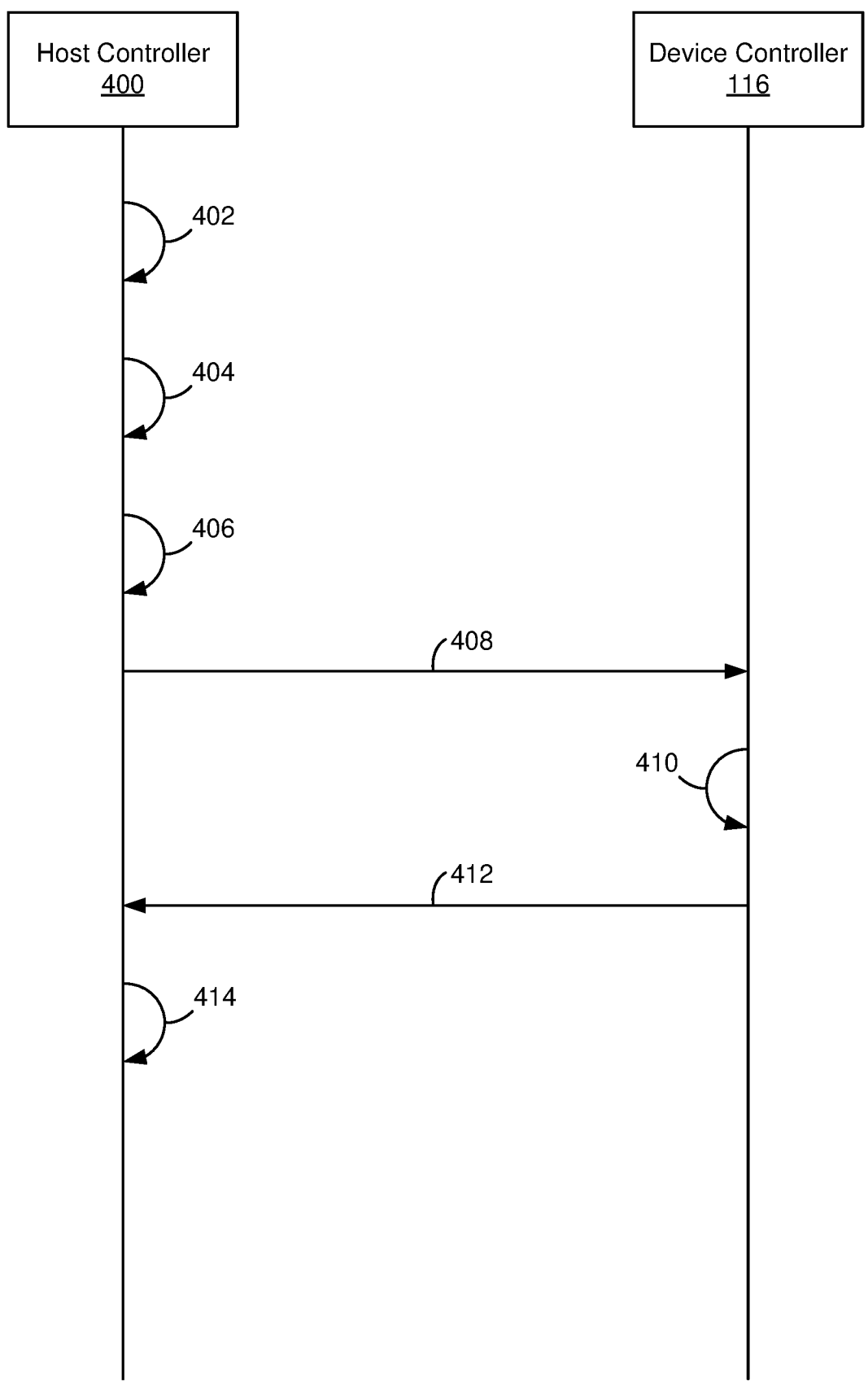
FIG. 4 is a component block and signaling diagram illustrating an example of HPB mode management for host control mode according to some embodiments.
Figure 5:
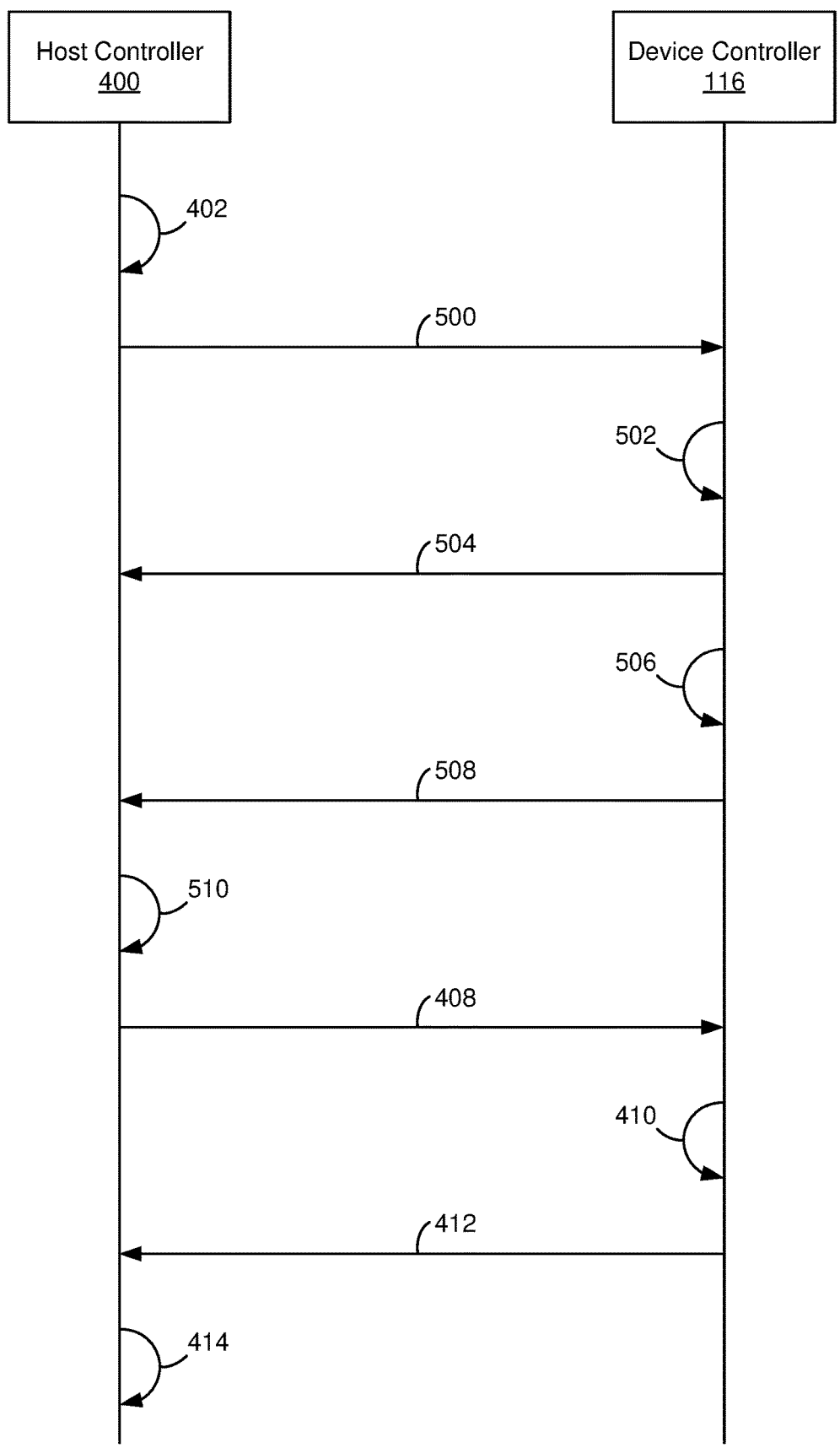
FIG. 5 is a component block and signaling diagram illustrating an example of HPB mode management for device control mode according to some embodiments.

FIGS. 4 and 5 are component block and signaling diagrams illustrating an example of HPB mode management for host control mode according to some embodiments. With reference to FIGS. 1-5, a host controller 400 (e.g., host controller 104, 262, processor 322) of an SoC (e.g., SoC 102, 202) may be communicably connected to a device controller 116 of a UFS device (e.g., UFS device 106) via a link (e.g., link 114). The host controller 400 and the device controller 116 may each be configured to execute computer code to implement computing operations. The host controller 400 and the device controller 116 may each be configured to send and receive signals, which may include computing data and/or computing instructions, between components of a computing device (e.g., system 100, computing device 200), including between each other, via the link.

With reference to FIG. 4, the host controller 400 may check an operating state of the host controller 400 and the device controller 116 in operation 402. Checking the operating state of the host controller 400 may include identifying a metric for determining an operating state of the host controller 400 and comparing the metric to a threshold to determine whether the operating state of the host controller 400 is busy or available. The metric may include pending and/or executing operations, such as a number of the operations, a duration of execution for the operations, etc. For example, the host controller 400 may identify a number of operations pending and/or being executed based on a number of entries in an operations queue, such as a CMDQ.

The host controller may compare the metric to the threshold to determine whether the operating state of the host controller 400 is busy or available. The threshold may include a value for which comparison of the metric exceeding the threshold may indicate to the host controller 400 that the operating state of the host controller 400 is busy and a comparison of the metric falling short of the threshold may indicate to the host controller 400 that the operating state of the host controller 400 is available. Depending on configuration of the threshold, comparison of the metric equaling the threshold may indicate to the host controller 400 that the operating state of the host controller 400 is either busy or available. For example, the threshold may be a value representing a single operation, and the metric indicating at least one operation is pending and/or executing at the host controller 400 may result in a determination that the operating state of the host controller 400 is busy. As another example, the threshold may be a value representing any number of operations greater than a single operation, and the metric indicating at least the number of operations of the threshold are pending and/or executing at the host controller 400 may result in a determination that the operating state of the host controller 400 is busy.

Checking the operating state of the device controller 116 may include interpreting a signal received from the device controller 116 configured to indicate the operating state of the device controller 116 to the host controller 400. For example, the signal may be a binary signal, such as bit stored at a register, for which one binary value may indicate to the host controller 400 that the operating state of the device controller 116 is busy and a different binary value may indicate to the host controller 400 that the operating state of the device controller 116 is available.

In response to the operating state of the host controller 400 being available and the operating state of the device controller 116 being busy, the host controller 400 may enable HCM as the HPB mode in operation 404. The host controller 400 and the device controller 116 may synchronize an L2P address mapping table (e.g., L2P-1) stored at a DRAM (e.g., DRAM 108) communicatively connected to the host controller 400 with an L2P address mapping table (e.g., L2P-2) stored at an SRAM (e.g., SRAM 110) of the UFS device and communicatively connected to the device controller 116. The L2P address mapping table stored at the DRAM may be synchronized by known methods for HCM, including the host controller 400 identifying any new HPB subregions of a NAND memory (e.g., NAND memory 112) of the UFS device to be activated in operation 406 and sending a request 408 to the device controller 116 to activate the HPB subregions based on the identification. For example, a method may be performed by a host controller of a computing device for HPB mode management may include synchronizing an address mapping table for the host controller and an address mapping table for the memory device controller in response to enabling the HPB mode.

The device controller 116 may receive the request to activate the HPB subregions and respond by reading the L2P address mapping table stored at the SRAM and communicatively connected to the device controller 116 for entries corresponding to the HPB subregions in operation 410, and sending the entries of the L2P address mapping table to the host controller 400 in communication 412.

The host controller 400 may receive the entries of the L2P address mapping table sent from the device controller 116 and update the L2P address mapping table stored at the DRAM by storing the entries of the L2P address mapping table received from the device controller 116 to the L2P address mapping table stored at the DRAM (414).

With reference to FIG. 5, the host controller 400 may check an operating state of the host controller 400 and the device controller 116 in operation 402, as described herein with reference to FIG. 4. In response to the operating state of the host controller 400 being busy and the operating state of the device controller 116 being available, the host controller 400 may send a request 500 to the device controller 116 to enable DCM as the HPB mode. The device controller 116 may receive the request to enable DCM and respond to the request by enabling DCM as the HPB mode in operation 502 and sending an acknowledgement 504 that DCM is enabled to the host controller 400.

The host controller 400 and the device controller 116 may synchronize an L2P address mapping table (e.g., L2P-1) stored at a DRAM (e.g., DRAM 108) communicatively connected to the host controller 400 with an L2P address mapping table (e.g., L2P-2) stored at an SRAM (e.g., SRAM 110) of the UFS device and communicatively connected to the device controller 116. The L2P address mapping table stored at the DRAM may be synchronized by known methods for DCM, including the device controller 116 identifying any new HPB subregions of a NAND memory (e.g., NAND memory 112) of the UFS device to be activated and/or deactivated in operation 506 and sending recommendations 508 for activating and/or deactivating the identified new HPB subregions. For example, a method may be performed by a host controller of a computing device for HPB mode management may include synchronizing an address mapping table for the host controller and an address mapping table for the memory device controller in response to enabling the HPB mode.

The host controller 400 may receive the recommendations for activating and/or deactivating the identified new HPB subregions and respond by discarding entries of the L2P address mapping table stored at the DRAM that are inactive (510) and sending a request to the device controller 116 to activate the HPB subregions in operation 408 based on the recommendations. The device controller 116 may receive the request to activate the HPB subregions and respond by reading the L2P address mapping table stored at the SRAM and communicatively connected to the device controller 116 for entries corresponding to the HPB subregions in operation 410, and sending the entries of the L2P address mapping table to the host controller 400 in communication 412.

The host controller 400 may receive the entries of the L2P address mapping table sent from the device controller 116 and update the L2P address mapping table stored at the DRAM by storing the entries of the L2P address mapping table received from the device controller 116 to the L2P address mapping table stored at the DRAM in operation 414.

Figure 6A:
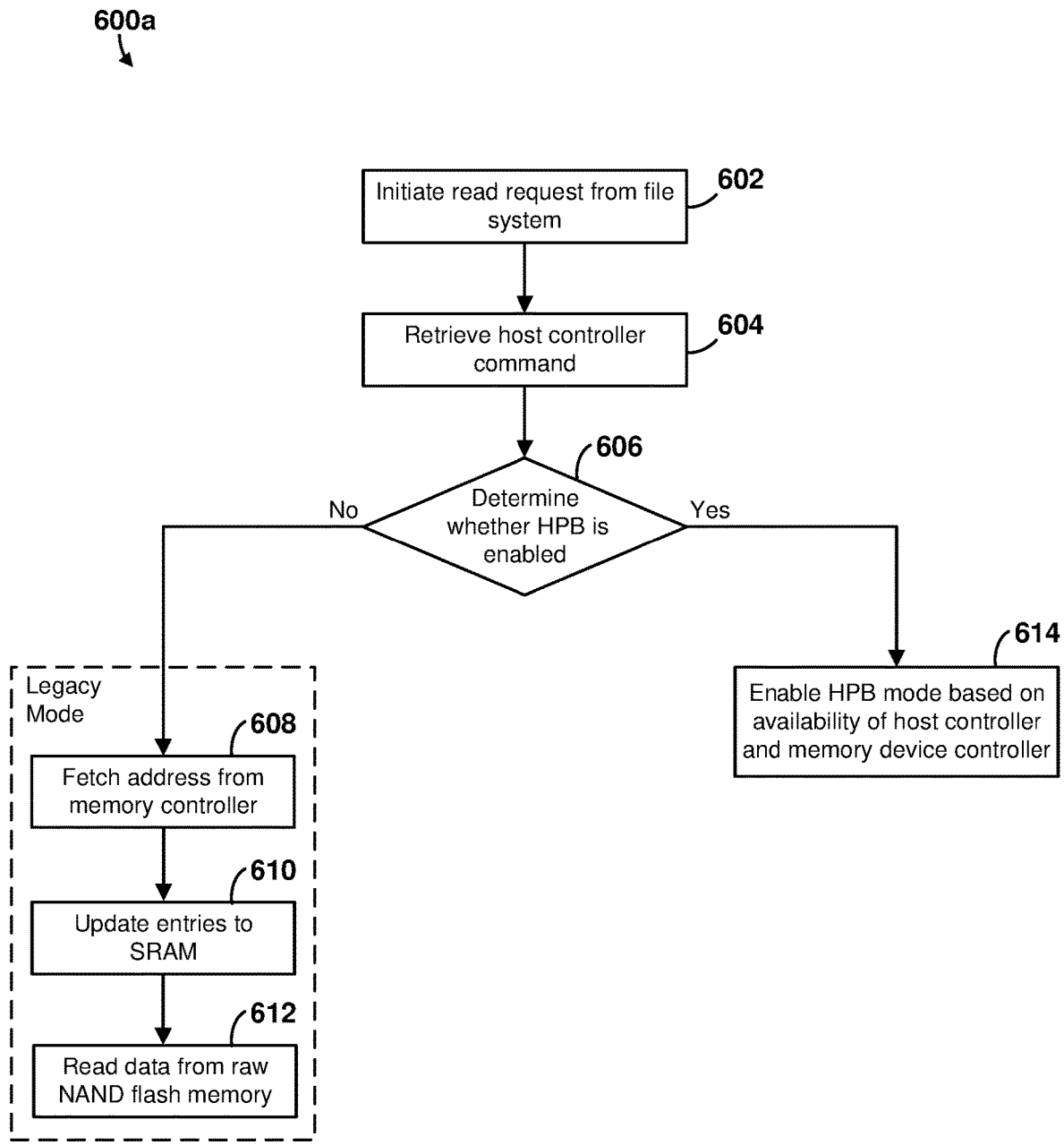
FIGS. 6A-6C are process flow diagrams of an example method for HPB mode management in accordance with some embodiments.
Figure 6B:
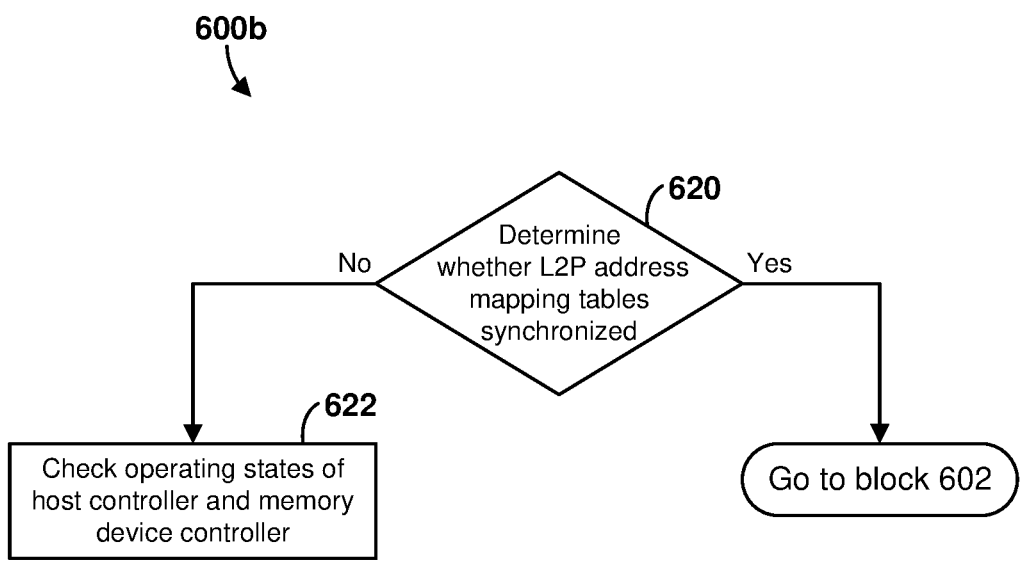
Figure 6C:
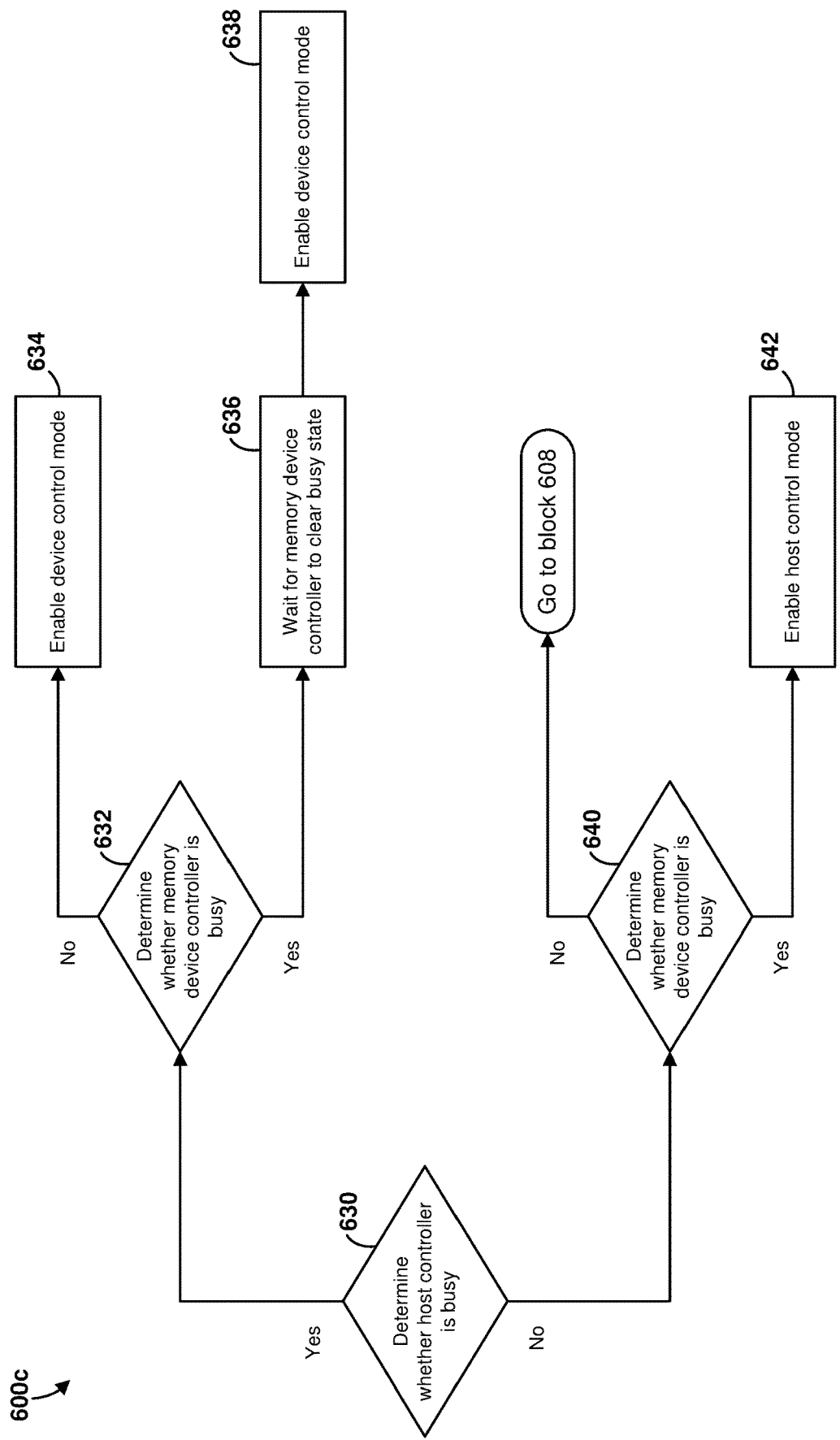

FIGS. 6A-6C are process flow diagrams of example methods 600a, 600b, 600c that may be performed by a host controller (e.g., by a processor within the host controller) of a computing device for managing HPB modes in accordance with various embodiments. With reference to FIGS. 1-6C, the methods 600a, 600b, 600c may be performed by a host controller (e.g., host controller 104, 262, processor 322) of a computing device (e.g., system 100, computing device 200, 302). In some embodiments, the host controller may include a processor (e.g., processor 322) configured to perform the operations by processor-executable instructions stored in a non-transitory processor-readable medium (e.g., DRAM 108, memory 220, 258, electronic storage 320). Means for performing the operations of the methods 600a, 600b, 600c may be the host controller, the processor, and/or the like as described with reference to FIGS. 1-6C.

Referring to FIG. 6A and method 600a, the host controller may initiate a read request from a file system in block 602. The read request initiation may include configuring the host controller to receive read requests (e.g., from a component of the SoC 102, 202 or a component or device communicatively connected to the SoC 102, 202 via I/O interface). In block 604, the host controller may retrieve a host controller command. In determination block 606, the host controller may determine whether HPB is enabled.

In response to determining that HPB is not enabled (i.e., determination block 606="No"), the host controller may perform memory read legacy operations in blocks 608, 610, and 612. In block 608, the host controller may fetch an address corresponding to a read request from a memory controller (e.g., of the SoC 102, 202). In block 610, the host controller may update the L2P address mapping table entries in the SRAM (e.g., SRAM 110). In block 612, the host controller, via a memory device controller (e.g., device controller 116) may read raw data from a NAND flash memory (e.g., NAND memory 112).

In response to determining that HPB is enabled (i.e., determination block 606="Yes"), the host controller may enable an HPB mode based on availability of the host controller and the memory device controller in block 614, as described further in the methods 600b, 600c with reference to FIGS. 6B and 6C. In some embodiments, the host controller enabling the HPB mode based on availability of the host controller and the memory device controller in block 614 may include the host controller executing any one and/or combination of the operating state check module 330, the HPB mode enable module 332, the sync check module 336, and the HPB L2P address mapping table sync module 342. For example, a method may be performed by a host controller of a computing device for HPB mode management including enabling the HPB mode based on availability of the host controller and availability of a memory device controller.

Referring to FIG. 6B and method 600b, the host controller may determine whether L2P address mapping tables are synchronized in determination block 620. The host controller, and in some embodiments, in parts via a memory device controller (e.g., device controller 116), may determine whether an L2P address mapping table (e.g., L2P-1) stored in a DRAM (e.g., DRAM 108) communicatively connected to the host controller and an L2P address mapping table (e.g., L2P-2) stored at an SRAM (e.g., SRAM 110) of a UFS device (e.g., UFS device 102) and communicatively connected to the memory device controller are synchronized. The host controller may determine whether the L2P address mapping tables are synchronized by known methods. In some embodiments, the host controller determining whether the L2P address mapping tables are synchronized in determination block 620 may include the host controller executing a sync check module 336. For example, a method may be performed by a host controller of a computing device for HPB mode management, further including determining whether an address mapping table for the host controller and an address mapping table for the memory device controller are synchronized.

In response to determining that the L2P address mapping tables are synchronized (i.e., determination block 620="Yes"), the host controller may initiate a read request from a file system in block 602 of the method 600a as described.

In response to determining that the L2P address mapping tables are not synchronized (i.e., determination block 620="No"), the host controller may check operating states of the host controller and the memory device controller in block 622, as described further in the method 600c with reference to FIG. 6C. In some embodiments, the host controller checking the operating states of the host controller and the memory device controller in block 622 may include the host controller executing any one and/or combination of the operating state check module 330, the HPB mode enable module 332, and the HPB L2P address mapping table sync module 342. For example, a method may be performed by a host controller of a computing device for HPB mode management including checking an operating state of the host controller, and checking an operating state of the memory device controller. For example, a method may be performed by a host controller of a computing device for HPB mode management, in which checking the operating state of the host controller and checking the operating state of the memory device controller occur in response to determining that the address mapping table for the host controller and the address mapping table for the memory device controller are not synchronized.

Referring to FIG. 6C and method 600c, the host controller may determine whether the host controller is busy in determination block 630. In some embodiments, the host controller determining whether the host controller is busy in determination block 630 may include the host controller executing the operating state check module 330. Determining whether the operating state of the host controller is busy may include checking the operating state of the host controller by identifying a metric for determining an operating state of the host controller and comparing the metric to a threshold to determine whether the operating state of the host controller is busy or available. The metric may include pending and/or executing operations, such as a number of the operations, a duration of execution for the operations, etc. For example, the host controller may identify a number of operations pending and/or being executed based on a number of entries in an operations queue, such as a CMDQ.

In some embodiments, the host controller may compare the metric to the threshold to determine whether the operating state of the host controller is busy or available. The threshold may include a value for which comparison of the metric exceeding the threshold may indicate to the host controller that the operating state of the host controller is busy and a comparison of the metric falling short of the threshold may indicate to the host controller that the operating state of the host controller is available. Depending on the threshold configuration, the metric equaling the threshold may indicate to the host controller that the operating state of the host controller is either busy or available.

In response to determining that the host controller is busy (i.e., determination block 630="Yes"), the host controller may determine whether the memory device controller (e.g., device controller 116) is busy in determination block 632. Determining whether the operating state of the memory device controller is busy may include checking the operating state of the memory device controller may by interpreting a signal received from of the memory device controller configured to indicate the operating state of the memory device controller to the host controller. For example, the signal may be a binary signal, such as bit stored at a register, for which one binary value may indicate to the host controller that the operating state of the memory device controller is busy and a different binary value may indicate to the host controller that the operating state of the memory device controller is available. In some embodiments, the host controller determining whether the memory device controller is busy in determination block 632 may include the host controller executing the operating state check module 330.

In response to determining that the memory device controller is not busy (i.e., determination block 632="No"), the host controller may enable DCM as the HPB mode in block 634. Enabling DCM as the HPB mode may be implemented by the host controller in part via the memory device controller. The host controller may send a request to the memory device controller to enable DCM at the memory device controller, and the memory device controller may respond to the request by enabling DCM at the memory device controller by known methods. In some embodiments, the host controller enabling DCM as the HPB mode in block 634 may include the host controller executing the HPB mode enable module 332. For example, a method may be performed by a host controller of a computing device for HPB mode management, in which enabling the HPB mode based on the availability of the host controller and the availability of the memory device controller includes enabling a device control mode in response to the operating state of the host controller being busy and the operating state of the memory device controller being available.

In response to determining that the memory device controller is busy (i.e., determination block 632="Yes"), the host controller may wait for the memory device controller to clear the busy operating state in block 636. Waiting for the memory device controller to clear the busy operating state may include, continuously, periodically, and/or episodically checking the operating state of the memory device controller. Checking the operating state of the memory device controller may be implemented in a manner similarly as described for determination block 632. In some embodiments, the host controller waiting for the memory device controller to clear the busy operating state in block 636 may include the host controller executing the HPB mode enable module 332. For example, a method may be performed by a host controller of a computing device for HPB mode management including waiting for the memory device controller to clear a busy operating state in response to the operating state of the host controller being busy and the operating state of the memory device controller being busy.

Following the memory device controller clearing the busy operating state, the host controller may enable DCM as the HPB mode in block 634. Enabling DCM as the HPB mode may be implemented similarly as described for block 634. In some embodiments, the host controller enabling DCM as the HPB mode in block 638 may include the host controller executing the HPB mode enable module 332. For example, a method may be performed by a host controller of a computing device for HPB mode management, in which enabling the HPB mode based on the availability of the host controller and the availability of the memory device controller includes enabling a device control mode in response to the memory device controller to clearing the busy operating state In response to determining that the host controller is not busy (i.e., determination block 630="No"), the host controller may determine whether the memory device controller is busy in determination block 640. Determining whether the operating state of the memory device controller is busy may be implemented similarly as described for determination block 632. In some embodiments, the host controller determining whether the memory device controller is busy in determination block 640 may include the host controller executing the operating state check module 330.

In response to determining that the memory device controller is not busy (i.e., determination block 640="No"), the host controller may perform memory read legacy operations in blocks 608, 610, and 612.

In response to determining that the memory device controller is busy (i.e., determination block 640="Yes"), the host controller may enable HCM as the HPB mode in block 642. Enabling DCM as the HPB mode by the host controller may be implemented by known methods. In some embodiments, the host controller enabling HCM as the HPB mode in block 642 may include the host controller executing the HPB mode enable module 332. For example, a method may be performed by a host controller of a computing device for HPB mode management, in which enabling the HPB mode based on the availability of the host controller and the availability of the memory device controller includes enabling a host control mode in response to the operating state of the host controller being available and the operating state of the memory device controller being busy.

Although the FIG. 6C illustrates first determining whether the host controller is busy in determination block 630 and the determining whether the memory device controller is busy in blocks 632, 640 depending on the outcome of determination block 630, one of skill in the art would realize that the order of the determinations in block 630 and blocks 632, 640 may be reversed while enabling implementation of blocks 602, 634, 636, 638, 648 based on the same combination of outcomes of the determinations. For example, the method 600c may be alternatively implemented by first determining whether the memory device controller is busy and then determining whether the host controller is busy.

Figure 7:
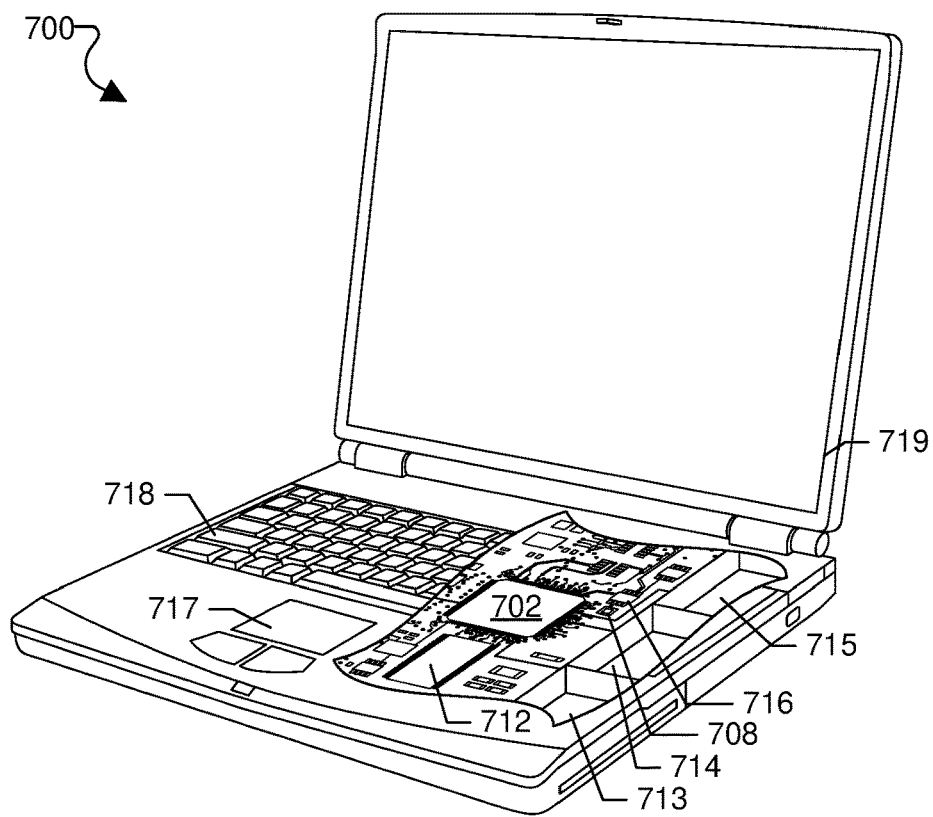
FIG. 7 is a component block diagram illustrating an example computing device suitable for use with the various embodiments.

The various embodiments (including, but not limited to, embodiments described with reference to FIGS. 1-6C) may be implemented in a wide variety of computing systems, which may include a laptop computer 700 (e.g., computing device 100, 200, 320), an example of which is illustrated in FIG. 7. With reference to FIGS. 1-7, a laptop computer may include a touchpad touch surface 717 that serves as the computer's pointing device, and thus may receive drag, scroll, and flick gestures similar to those implemented on computing devices equipped with a touch screen display and described above. A laptop computer 700 will typically include a processor 702 coupled to volatile memory 712 and a large capacity nonvolatile memory, such as a disk drive 713 of Flash memory. Additionally, the computer 700 may have one or more antenna 708 for sending and receiving electromagnetic radiation that may be connected to a wireless data link and/or cellular telephone transceiver 716 coupled to the processor 702. The computer 700 may also include a floppy disc drive 714 and a compact disc (CD) drive 715 coupled to the processor 702. The laptop computer 700 may include a touchpad 717, a keyboard 718, and a display 719 all coupled to the processor 702. Other configurations of the computing device may include a computer mouse or trackball coupled to the processor (e.g., via a USB input) as are well known, which may also be used in conjunction with the various embodiments.

Figure 8:
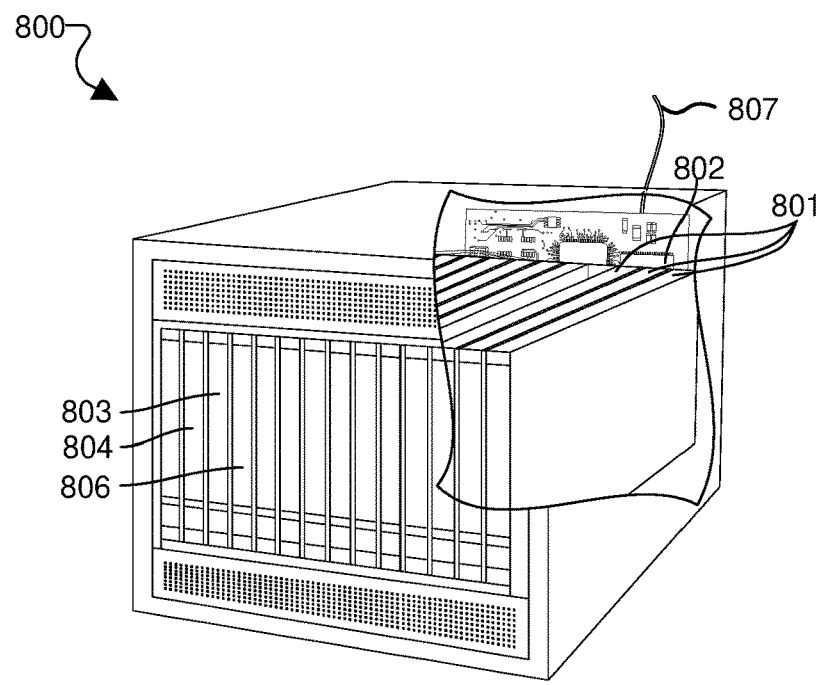
FIG. 8 is a component block diagram illustrating an example server suitable for use with the various embodiments.

FIG. 8 is a component block diagram of a computing device 800, such as a server, suitable for use with various embodiments. Such computing devices may include at least the components illustrated in FIG. 8. With reference to FIGS. 1-8, the computing device 800 (e.g., computing device 100, 200, 320) may include a processor 801 coupled to volatile memory 802 and a large capacity nonvolatile memory, such as a disk drive 803.

The computing device 800 may also include a peripheral memory access device such as a floppy disc drive, compact disc (CD) or digital video disc (DVD) drive 806 coupled to the processor 801. The computing device 800 may also include network access ports 804 (or interfaces) coupled to the processor 801 for establishing data connections with a network, such as the Internet and/or a local area network coupled to other system computers and servers.

The computing device 800 may include one or more antennas 807 for sending and receiving electromagnetic radiation that may be connected to a wireless communication link. The computing device 800 may include additional access ports, such as USB, Firewire, Thunderbolt, and the like for coupling to peripherals, external memory, or other devices.

Figure 9:
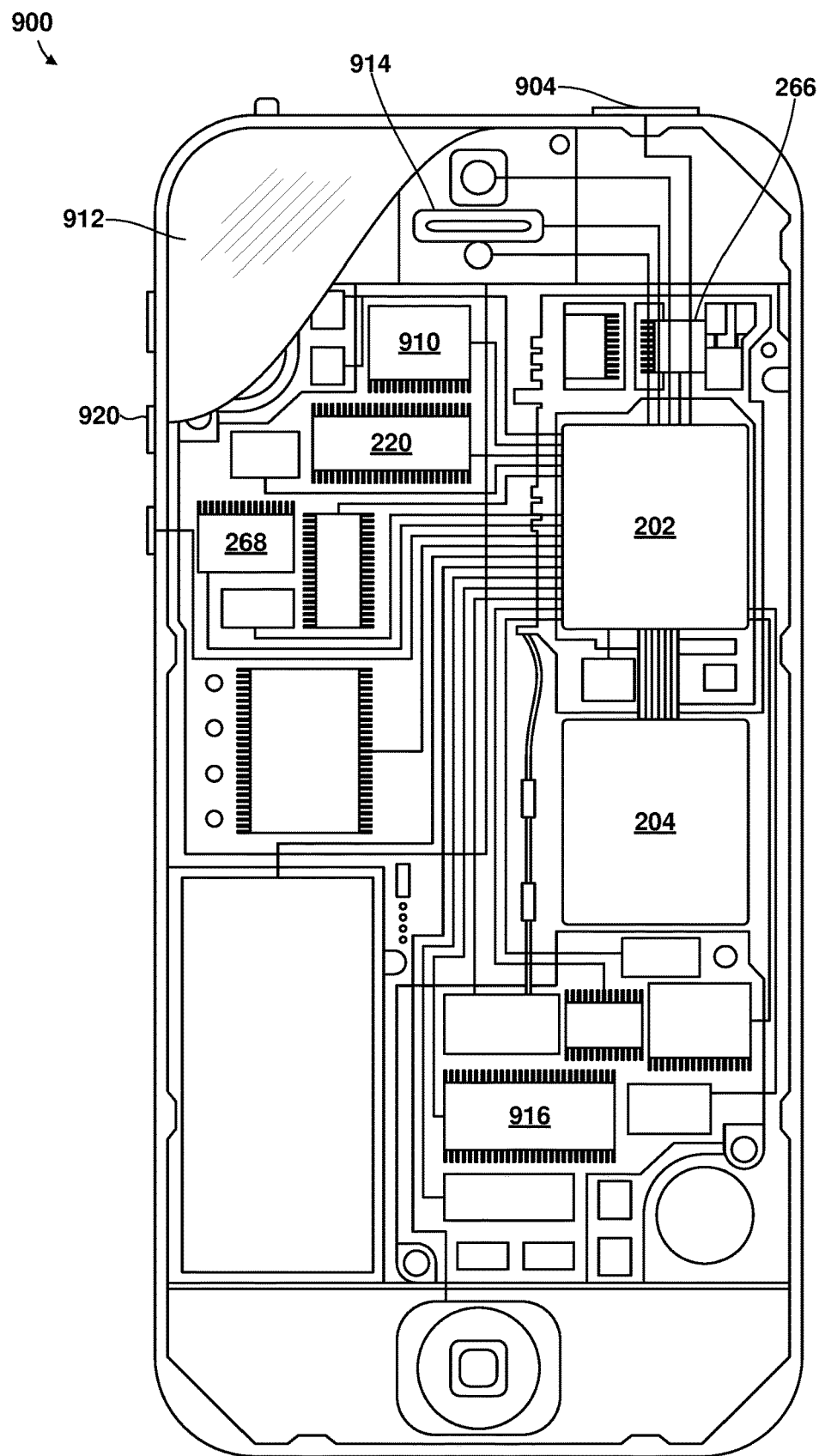
FIG. 9 is a component block diagram illustrating an example wireless communication device suitable for use with the various embodiments.

FIG. 9 is a component block diagram of a computing device 900 suitable for use with various embodiments. With reference to FIGS. 1-9, various embodiments may be implemented on a variety of computing devices 900 (e.g., computing device 100, 200, 320), an example of which is illustrated in FIG. 9 in the form of a smartphone. The computing device 900 may include a first SoC 202 (e.g., a SoC-CPU) coupled to a second SoC 204 (e.g., a 5G capable SoC). The first and second SoCs 202, 204 may be coupled to internal memory 916, a display 912, and to a speaker 914. The first and second SoCs 202, 204 may also be coupled to at least one SIM 268 and/or a SIM interface that may store information supporting a first 5GNR subscription and a second 5GNR subscription, which support service on a 5G non-standalone (NSA) network.

The computing device 900 may include an antenna 904 for sending and receiving electromagnetic radiation that may be connected to a wireless transceiver 266 coupled to one or more processors in the first and/or second SoCs 202, 204. The computing device 900 may also include menu selection buttons or rocker switches 920 for receiving user inputs.

The computing device 900 also includes a sound encoding/decoding (CODEC) circuit 910, which digitizes sound received from a microphone into data packets suitable for wireless transmission and decodes received sound data packets to generate analog signals that are provided to the speaker to generate sound. Also, one or more of the processors in the first and second SoCs 202, 204, wireless transceiver 266 and CODEC 910 may include a digital signal processor (DSP) circuit (not shown separately).

The processors of the computer 700, the computing device 800, and the computing device 900 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SoC 204 dedicated to wireless communication functions and one processor within an SoC 202 dedicated to running other applications. Software applications may be stored in memory 220, 916 before they are accessed and loaded into the processor. The processors may include internal memory sufficient to store the application software instructions.

Implementation examples are described in the following paragraphs. While some of the following implementation examples are described in terms of example methods that may be performed in a computing device by a host controller, further example implementations may include: a computing device including a host controller configured to perform the methods of the following implementation examples; a computing device including means for performing functions of the following implementation examples, a host controller suitable for use in a computing device, in which the host controller includes a processor configured to perform the methods of the following implementation examples; and a non-transitory, processor-readable memory having stored thereon processor-executable instructions configured to cause a host controller in a computing device configured to perform the methods of the following implementation examples.

Example 1. A method performed by a host controller of a computing device for host performance booster (HPB) mode management, including enabling an HPB mode based on availability of the host controller and availability of a memory device controller.

Example 2. The method of example 1, further including checking an operating state of the host controller, and checking an operating state of the memory device controller.

Example 3. The method of example 2, in which enabling the HPB mode based on the availability of the host controller and the availability of the memory device controller includes enabling a device control mode in response to the operating state of the host controller being busy and the operating state of the memory device controller being available.

Example 4. The method of example 2, in which enabling the HPB mode based on the availability of the host controller and the availability of the memory device controller includes enabling a host control mode in response to the operating state of the host controller being available and the operating state of the memory device controller being busy.

Example 5. The method of example 2, further including waiting for the memory device controller to clear a busy state in response to the operating state of the host controller being busy and the operating state of the memory device controller being busy, in which enabling the HPB mode based on the availability of the host controller and the availability of the memory device controller includes enabling a device control mode in response to the memory device controller to clearing the busy state.

Example 6. The method of example 2, further including determining whether an address mapping table for the host controller and an address mapping table for the memory device controller are synchronized, in which checking the operating state of the host controller and checking the operating state of the memory device controller occur in response to determining that the address mapping table for the host controller and the address mapping table for the memory device controller are not synchronized.

Example 7. The method of any of examples 1-6, further including synchronizing an address mapping table for the host controller and an address mapping table for the memory device controller in response to enabling the HPB mode.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), Long Term Evolution (LTE) systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general Packet Radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (TCUASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A computing device, comprising:
 a host controller configured to:
  determine an operating state of the host controller, wherein the operating state comprises an available operating state or a busy operating state;
  enable a host performance booster (HPB) mode in which a logical-to-physical (L2P) address mapping table, associated with one or more physical addresses in a universal flash storage (UFS) device, is maintained in a host memory associated with the host controller;

enable a device control mode (DCM) of the HPB mode based on the host controller being in the busy operating state, wherein in the DCM, a memory device controller of the UFS device indicates active or inactive subregions of the L2P address mapping table; and receive, in the DCM, a notification from the memory device controller indicating to activate or deactivate at least one subregion of the L2P address mapping table maintained in the host memory of the host controller.

2. The computing device of claim 1, wherein the operating state of the host controller is associated with:
a number of operations pending with the host controller;
a duration of execution for the operations;
a number of entries in an operations queue of the host controller;
a number of entries in a command queue of the host controller; or
any combination thereof.

3. The computing device of claim 1, wherein the host controller is configured to enable the DCM further based on the memory device controller being in an available operating state.

4. The computing device of claim 1, wherein in a host control mode (HCM), the host controller indicates active or inactive subregions of the L2P address mapping table.

5. The computing device of claim 1, wherein the host controller is configured to:
wait for the memory device controller to clear a busy operating state in response to the host controller being in the busy operating state and the memory device controller being in a busy operating state; and
enable the HPB mode in response to the memory device controller clearing the busy operating state.

6. The computing device of claim 1, wherein the host controller is further configured to:
determine whether an address mapping table for the host controller and an address mapping table for the memory device controller are synchronized; and
determine the operating state of the host controller and determine the operating state of the memory device controller in response to determining that the address mapping table for the host controller and the address mapping table for the memory device controller are not synchronized.

7. The computing device of claim 1, wherein the host controller is further configured to:
synchronize an address mapping table for the host controller and an address mapping table for the memory device controller in response to enabling the HPB mode.

8. A method performed by a host controller, comprising:
determining an operating state of the host controller, wherein the operating state comprises an available operating state or a busy operating state;
enabling a host performance booster (HPB) mode in which a logical-to-physical (L2P) address mapping table, associated with one or more physical addresses in a universal flash storage (UFS) device, is maintained in a host memory associated with the host controller;
enabling a device control mode (DCM) of the HPB mode based on the host controller being in the busy operating state, wherein in the DCM, a memory device controller of the UFS device indicates active or inactive subregions of the L2P address mapping table; and receiving, in the DCM, a notification from the memory device controller indicating to activate or deactivate at least one subregion of the L2P address mapping table maintained in the host memory of the host controller.

9. The method of claim 8, wherein the operating state of the host controller is associated with:
a number of operations pending with the host controller;
a duration of execution for the operations;
a number of entries in an operations queue of the host controller;
a number of entries in a command queue of the host controller; or
any combination thereof.

10. The method of claim 9, wherein enabling the DCM is further based on
the memory device controller being in and available operating state.

11. The method of claim 8, wherein in a host control mode (HCM), the host controller indicates active or inactive subregions of the L2P address mapping table.

12. The method of claim 8, further comprising:
waiting for the memory device controller to clear a busy operating state in response to the host controller being in the busy operating state and the memory device controller being in a busy operating state; and
enabling the HPB mode in response to the memory device controller clearing the busy operating state.

13. The method of claim 9, further comprising:
determining whether an address mapping table for the host controller and an address mapping table for the memory device controller are synchronized; and
determining the operating state of the host controller and determining the operating state of the memory device controller occur in response to determining that the address mapping table for the host controller and the address mapping table for the memory device controller are not synchronized.

14. The method of claim 8, further comprising synchronizing an address mapping table for the host controller and an address mapping table for the memory device controller in response to enabling the HPB mode.

15. A computing device, comprising:
means for determining an operating state of the host controller, wherein the operating state comprises an available operating state or a busy operating state;
means for enabling a host performance booster (HPB) mode in which a logical-to-physical (L2P) address mapping table, associated with one or more physical addresses in a universal flash storage (UFS) device, is maintained in a host memory associated with the host controller;
means for enabling a device control mode (DCM) of the HPB mode based on the host controller being in the busy operating state, wherein in the DCM, a memory device controller of the UFS device indicates active or inactive subregions of the L2P address mapping table; and
means for receiving, in the DCM, a notification from the memory device controller indicating to activate or deactivate at least one subregion of the L2P address mapping table maintained in the host memory of the host controller.

16. The computing device of claim 15, wherein the operating state of the host controller is associated with:
a number of operations pending with the host controller;
a duration of execution for the operations;

a number of entries in an operations queue of the host controller;
a number of entries in a command queue of the host controller; or
any combination thereof.

17. The computing device of claim 15, wherein the means for enabling the DCM further comprises means for enabling the DCM based on
the memory device controller being in an available operating state.

18. The computing device of claim 15, wherein the means for enabling the HPB mode comprises means for enabling a host control mode (HCM) in which the host controller indicates active or inactive subregions of the L2P address mapping table.

19. The computing device of claim 15, further comprising:
means for waiting for the memory device controller to clear a busy operating state in response to the host controller being in the busy operating state and the memory device controller being in a busy operating state; and
means for enabling the HPB mode in response to the memory device controller clearing the busy operating state.

20. The computing device of claim 15, further comprising:
means for determining whether an address mapping table for the host controller and an address mapping table for the memory device controller are synchronized; and
means for determining the operating state of the host controller and determining the operating state of the memory device controller in response to determining that the address mapping table for the host controller and the address mapping table for the memory device controller are not synchronized.

21. The computing device of claim 15, further comprising means for synchronizing an address mapping table for the host controller and an address mapping table for the memory device controller in response to enabling the HPB mode.

22. A host controller, wherein the host controller is configured to:
determine an operating state of the host controller, wherein the operating state comprises an available operating state or a busy operating state;
enable a host performance booster (HPB) mode in which a logical-to-physical (L2P) address mapping table, associated with one or more physical addresses in a universal flash storage (UFS) device, is maintained in a host memory associated with the host controller;
enable a device control mode (DCM) of the HPB mode based on the host controller being in the busy operating state, wherein in the DCM, a memory device controller of the UFS device indicates active or inactive subregions of the L2P address mapping table; and
receive, in the DCM, a notification from the memory device controller indicating to activate or deactivate at least one subregion of the L2P address mapping table maintained in the host memory of the host controller.

23. The host controller of claim 22, wherein the operating state of the host controller associated with:
a number of operations pending with the host controller;
a duration of execution for the operations;
a number of entries in an operations queue of the host controller;
a number of entries in a command queue of the host controller; or
any combination thereof.

24. The host controller of claim 22, wherein the host controller is configured to enable the DCM further based on the memory device controller being in an available operating state.

25. The host controller of claim 22, wherein in a host control mode (HCM), the host controller indicates active or inactive subregions of the L2P address mapping table.

26. The host controller of claim 22, wherein the host controller is configured to:
wait for the memory device controller to clear a busy operating state in response to the host controller being in the busy operating state and the memory device controller being in a busy operating state; and
enable the HPB mode in response to the memory device controller clearing the busy operating state.

27. The host controller of claim 22, wherein the host controller is further configured to:
determine whether an address mapping table for the host controller and an address mapping table for the memory device controller are synchronized; and
determine the operating state of the host controller and determine the operating state of the memory device controller in response to determining that the address mapping table for the host controller and the address mapping table for the memory device controller are not synchronized.

28. The host controller of claim 22, wherein the host controller is further configured to:
synchronize an address mapping table for the host controller and an address mapping table for the memory device controller in response to enabling the HPB mode.

* * * * *